US012756348B2

(12) United States Patent
Gereige et al.

(10) Patent No.: US 12,756,348 B2
(45) Date of Patent: Oct. 6, 2026

(54) HYBRID SYSTEM FOR OFFSHORE POWER GENERATION

(71) Applicant: SAUDI ARABIAN OIL COMPANY, Dhahran (SA)

(72) Inventors: Issam Gereige, Dhahran (SA); Konstantinos Kotsovos, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 19/034,969

(22) Filed: Jan. 23, 2025

(65) Prior Publication Data

US 2026/0213694 A1 Jul. 23, 2026

(51) Int. Cl.

*H02S 10/12* (2014.01)
*F03D 9/00* (2016.01)
(Continued)

(52) U.S. Cl.

CPC .............. *H02S 10/12* (2014.12); *F03D 9/007* (2013.01); *H02S 10/20* (2014.12); *H02S 10/40* (2014.12);
(Continued)

(58) Field of Classification Search

CPC .......... H02S 10/12; H02S 10/20; H02S 10/40; H02S 30/10; F03D 9/007; F05B 2220/708
See application file for complete search history.

(56) References Cited

U.S. PATENT DOCUMENTS 4,119,863 A * 10/1978 Kelly ...................... F03D 15/10 136/246
4,200,904 A * 4/1980 Doan ...................... F21S 9/035 362/183
(Continued)

FOREIGN PATENT DOCUMENTS

CA 2877885 A1 * 1/2013 ............... F03D 9/25
CH 695707 A5 * 7/2006 ............. H02S 40/38
(Continued)

OTHER PUBLICATIONS

Kevin Robinson-Avila; Los Lunas tries out new solar technology; Albuquerque Journal; Jul. 20, 2020; retrieved from https://www.abqjournal.com/business/los-lunas-tries-out-new-solar-technologyarticle_bebf1b5b-2dfa-502f-9836-492bb407c625.html.

*Primary Examiner* — Pedro J Cuevas
(74) *Attorney, Agent, or Firm* — Vorys, Sater, Seymour and Pease LLP

(57) ABSTRACT

Systems and devices provided herein facilitate offshore energy production. Systems may include a mounting frame including at a first vertical side and a second vertical side, wherein the first and second vertical sides are arranged at an angle relative to one another; a first set of modular photovoltaic (PV) panels affixed to the first vertical side, the first set of modular PV panels configured to capture light incident on the first set of modular PV panels and convert the light incident into energy; a second set of modular PV panels affixed to the second vertical side, the second set of modular PV panels configured to capture light incident on the first set
(Continued)

of modular PV panels and convert the light incident into energy; and a set of turbines affixed to each top corner of the mounting structure and configured to capture wind energy and convert the wind energy into energy.

20 Claims, 4 Drawing Sheets

(51) Int. Cl.
*H02S 10/20* (2014.01)
*H02S 10/40* (2014.01)
*H02S 30/10* (2014.01)

(52) U.S. Cl.
CPC ........ *H02S 30/10* (2014.12); *F05B 2220/708* (2013.01)

(56) References Cited

U.S. PATENT DOCUMENTS

| | | | | | |
|---|---|---|---|---|---|
| 4,433,544 | A | * | 2/1984 | Wells | F03D 3/04<br>290/55 |
| 5,394,016 | A | * | 2/1995 | Hickey | F03D 9/11<br>415/905 |
| 6,226,933 | B1 | * | 5/2001 | Nelson | E04H 12/20<br>43/124 |
| 6,519,901 | B1 | * | 2/2003 | Nelson | E04H 12/20<br>340/8.1 |
| 7,045,702 | B2 | * | 5/2006 | Kashyap | H02S 10/10<br>290/55 |
| 7,518,255 | B2 | * | 4/2009 | Gordon | F03D 13/20<br>290/55 |
| 7,976,180 | B1 | * | 7/2011 | Haun | F21S 9/035<br>362/153.1 |
| 8,007,124 | B2 | * | 8/2011 | Kim | F21S 8/086<br>362/267 |
| 8,043,499 | B2 | * | 10/2011 | Saeed | C02F 9/20<br>290/55 |
| 8,278,868 | B2 | * | 10/2012 | Caudill | H01M 10/46<br>307/29 |
| 8,282,236 | B2 | * | 10/2012 | Pelken | H02S 10/12<br>362/183 |
| 8,288,884 | B1 | * | 10/2012 | Malcolm | F03D 9/25<br>290/55 |
| 8,330,296 | B2 | | 12/2012 | Ottman | |
| 8,350,482 | B2 | * | 1/2013 | Nevins | F21S 8/086<br>315/159 |
| 8,393,149 | B2 | * | 3/2013 | Jones | F03D 80/70<br>415/60 |
| 8,854,794 | B2 | * | 10/2014 | Van Straten | F24S 25/10<br>290/55 |
| 8,864,207 | B2 | * | 10/2014 | Hixson | B60P 3/0257<br>296/22 |
| 9,046,235 | B2 | | 6/2015 | Wilson | |
| 9,835,133 | B2 | * | 12/2017 | Al-Garni | F03D 3/005 |
| 9,859,839 | B2 | * | 1/2018 | Pugina | F03D 9/007 |
| 10,490,682 | B2 | * | 11/2019 | Campanella | H10F 19/85 |
| 10,522,700 | B2 | * | 12/2019 | Campanella | H10F 77/937 |
| 10,522,701 | B2 | * | 12/2019 | Campanella | H10F 19/804 |
| 10,526,096 | B2 | | 1/2020 | Todter et al. | |
| 10,529,880 | B2 | * | 1/2020 | Campanella | H10F 19/85 |
| 11,035,341 | B1 | * | 6/2021 | Ottman | F03D 9/007 |
| 11,053,921 | B2 | * | 7/2021 | Gong | F03D 9/007 |
| 11,149,716 | B2 | * | 10/2021 | Zheng | F03D 9/25 |
| D945,952 | S | * | 3/2022 | Kiefer, III | D13/102 |
| 11,362,616 | B2 | * | 6/2022 | Duggal | H10F 19/00 |
| 11,881,809 | B2 | * | 1/2024 | Cook | H02S 20/32 |
| 12,110,875 | B2 | * | 10/2024 | Ghinda | H02K 7/183 |
| 12,228,105 | B2 | * | 2/2025 | Farb | F03D 1/02 |
| 12,305,610 | B2 | * | 5/2025 | Farb | H04N 7/18 |
| 12,362,698 | B2 | * | 7/2025 | Farb | B60L 53/52 |
| 2010/0183443 | A1 | | 7/2010 | Thorne | |
| 2010/0220467 | A1 | * | 9/2010 | Daidone | F21S 9/043<br>362/183 |
| 2010/0295319 | A1 | * | 11/2010 | Britnell | F03D 3/0427<br>290/55 |
| 2012/0020060 | A1 | * | 1/2012 | Myer | H02S 40/38<br>362/183 |
| 2012/0104785 | A1 | * | 5/2012 | Hixson | B60P 3/0257<br>296/24.36 |
| 2012/0302228 | A1 | * | 11/2012 | Gray | H02J 3/381<br>307/69 |
| 2014/0125134 | A1 | * | 5/2014 | Van Straten | E04H 12/182<br>320/101 |
| 2014/0202154 | A1 | * | 7/2014 | Tilghman | F03G 6/001<br>60/641.15 |
| 2015/0043200 | A1 | * | 2/2015 | Wilson | F21S 9/043<br>362/145 |
| 2015/0054286 | A1 | * | 2/2015 | Al-Garni | F03D 7/02<br>290/55 |
| 2015/0167636 | A1 | * | 6/2015 | Al-Garni | H02S 10/12<br>290/55 |
| 2016/0065115 | A1 | * | 3/2016 | Pugina | H02S 10/12<br>307/72 |
| 2017/0356422 | A1 | * | 12/2017 | Armstrong | F24S 23/71 |
| 2018/0254736 | A1 | * | 9/2018 | Duggal | H02S 20/10 |
| 2019/0288138 | A1 | * | 9/2019 | Campanella | H02S 40/34 |
| 2019/0288139 | A1 | * | 9/2019 | Campanella | H10F 19/80 |
| 2019/0288140 | A1 | * | 9/2019 | Campanella | H10F 19/80 |
| 2019/0288141 | A1 | * | 9/2019 | Campanella | H02S 40/34 |
| 2019/0326846 | A1 | * | 10/2019 | Ansari | C02F 1/006 |
| 2020/0161489 | A1 | * | 5/2020 | Campanella | H10F 77/937 |
| 2021/0025369 | A1 | * | 1/2021 | Zheng | B63B 35/44 |
| 2021/0108396 | A1 | * | 4/2021 | Bromley | H01M 10/425 |
| 2021/0351737 | A1 | * | 11/2021 | Cook | H02S 10/12 |
| 2023/0246584 | A1 | * | 8/2023 | Perret | H02S 20/30<br>136/245 |
| 2024/0110545 | A1 | * | 4/2024 | Cook | H02S 20/00 |
| 2024/0209837 | A1 | * | 6/2024 | Ghinda | H02S 40/32 |
| 2024/0337237 | A1 | * | 10/2024 | Farb | F03D 1/02 |
| 2024/0337252 | A1 | * | 10/2024 | Farb | F03D 9/007 |
| 2025/0158564 | A1 | * | 5/2025 | Hughes | H02S 30/10 |

FOREIGN PATENT DOCUMENTS

| | | | | | |
|---|---|---|---|---|---|
| CN | 103891130 | B | * | 11/2018 | B60L 53/52 |
| CN | 113595470 | A | * | 11/2021 | H02S 10/12 |
| CN | 219181432 | U | | 6/2023 | |
| CN | 219713181 | U | | 9/2023 | |
| CN | 220535894 | U | | 2/2024 | |
| CN | 119508140 | A | * | 2/2025 | H02S 20/10 |
| CZ | 306121 | B6 | * | 8/2016 | |
| DE | 202010017184 | U1 | * | 5/2011 | F03D 9/007 |
| ES | 2408331 | A1 | * | 6/2013 | F03D 9/007 |
| WO | WO-2004090327 | A2 | * | 10/2004 | H02S 40/38 |
| WO | WO-2011128463 | A1 | * | 10/2011 | H02S 10/40 |
| WO | WO-2012026883 | A2 | * | 3/2012 | B63B 35/38 |
| WO | WO-2021226194 | A1 | * | 11/2021 | H02S 10/12 |
| WO | 2022171357 | A1 | | 8/2022 | |

* cited by examiner

HYBRID SYSTEM FOR OFFSHORE POWER GENERATION

FIELD OF THE DISCLOSURE

The present disclosure relates generally to energy production and, more particularly, to enhanced systems for offshore energy production.

BACKGROUND OF THE DISCLOSURE

Renewable offshore energy production has emerged as a vital part of the transition to sustainable energy, offering vast potential for reducing carbon emissions and combating climate change. The strategic importance of renewable offshore energy production is underscored by its ability to provide energy to coastal regions, which are often densely populated and industrially significant. Moreover, advancements in technology and engineering have made offshore energy projects more viable and efficient, thereby enhancing their economic and environmental benefits. However, functionality and throughput of offshore energy plants may be hindered by harsh marine environments. Additionally, the logistical complexities of transporting materials and maintaining equipment in remote offshore locations can drive up operational costs while diminishing the lifecycle of energy capture systems.

Although current techniques for renewable offshore energy production are based on technological advancements made over many years, current assessment techniques may still be ineffective to achieve ideal results. For example, energy capture performed in an offshore marine environment may be degrade as a result of wildlife. Accordingly, there is an impetus to improve renewable offshore energy production technology to overcome current technological challenges by implementing improvements including, for example: enhancing the reliability of renewable offshore energy production systems, increasing the throughput of renewable offshore energy production systems, reducing inefficiencies associated with renewable offshore energy production techniques, reducing errors associated with renewable offshore energy production techniques, increasing the portability of renewable offshore energy production systems, decreasing the cost of renewable offshore energy production, and the like.

Consequently, there exists a need for further improvements to renewable offshore energy production technology to overcome the aforementioned technical challenges and other challenges not mentioned.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a system for offshore energy production may include a mounting frame including at a first vertical side and a second vertical side, wherein the first and second vertical sides are arranged at an angle relative to one another. The system may further include a first set of modular photovoltaic (PV) panels affixed to the first vertical side, the first set of modular PV panels configured to capture a first light incident on the first set of modular PV panels and convert the first light incident into a first primary electrical energy. The system may further include a second set of modular PV panels affixed to the second vertical side, the second set of modular PV panels configured to capture a second light incident on the first set of modular PV panels and convert the second light incident into a second primary electrical energy. The system may further include a set of turbines affixed to each top corner of the mounting structure, the set of wind turbines configured to capture wind energy and convert the wind energy into a first supplementary electrical energy.

According to an embodiment consistent with the present disclosure, a system for offshore energy production may include a mounting frame including at a first vertical side and a second vertical side, wherein the first and second vertical sides are arranged at an angle relative to one another. The system may further include a first set of modular photovoltaic (PV) panels affixed to the first vertical side, the first set of modular PV panels configured to capture a first light incident on the first set of modular PV panels and convert the first light incident into a first primary electrical energy. The system may further include a second set of modular PV panels affixed to the second vertical side, the second set of modular PV panels configured to capture a second light incident on the first set of modular PV panels and convert the second light incident into a second primary electrical energy. The system may further include a set of turbines affixed to each top corner of the mounting structure, the set of wind turbines configured to capture wind energy and convert the wind energy into a first supplementary electrical energy. The system may further include a stack affixed to the mounting frame and disposed between the first vertical side and the second vertical side. The system may further include a center turbine coupled to the stack, the center turbine configured to convert the wind into a second supplementary electrical energy. The system may further include an inverted funnel affixed within the mounting frame, wherein the inverted funnel is configured to direct the wind into the stack towards the center turbine.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
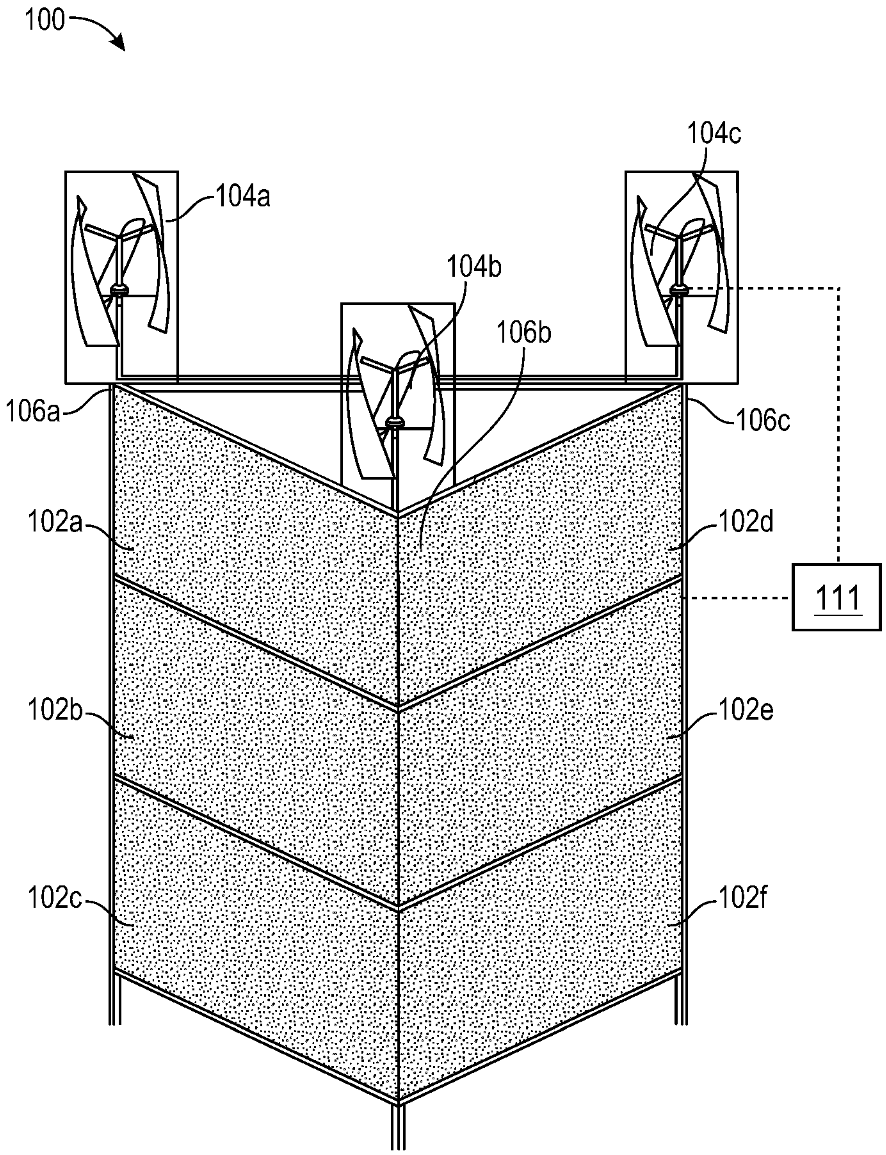
FIG. 1 is a schematic representation of an example photovoltaic (PV) system, according to one or more embodiments of the present disclosure.

Embodiments of the present disclosure will now be described in detail with reference to the accompanying drawing figures. Like elements in the various figures may be denoted by like reference numerals. Further, in the following detailed description, specific details are set forth in order to provide a more thorough understanding of the claimed subject matter. However, it will be apparent to one of ordinary skill in the art that the embodiments disclosed herein may be practiced without these specific details, or with details that are not described herein in the interest of clarity. Thus in some instances, well-known features have not been described in detail to avoid unnecessarily complicating the description. Additionally, it will be apparent to one of ordinary skill in the art that the scale of the elements presented in the accompanying drawing figures may vary without departing from the scope of the present disclosure.

Embodiments in accordance with the present disclosure generally relate to photovoltaic (PV) systems, and more specifically to an enhanced, modular PV systems for offshore energy production.

PV systems for offshore operations may be capable of harnessing solar energy in marine environments. These systems are designed to convert sunlight directly into electricity using solar panels composed of semiconductor materials (e.g., silicon). A PV system converts sunlight into electricity through a process known as the photovoltaic effect. The core component of a PV system is the solar cell. When sunlight strikes the surface of the solar cell, photons from the light are absorbed by the semiconductor material, exciting electrons and causing them to move. This movement of electrons creates an electric current. Specifically, the absorbed photons transfer their energy to electrons in the semiconductor, allowing these electrons to break free from their atomic bonds and flow through the material. This flow of electrons is directed by an electric field within the solar cell, which is created by the junction of two different types of semiconductor materials (e.g., p-type and n-type). The resulting direct current (DC) electricity is then collected by metal contacts on the surface of the cell and can be used immediately, stored in batteries, or converted to alternating current (AC) using an inverter for use in standard electrical grids. The efficiency of this conversion process depends on various factors, including the quality of the semiconductor material, the design of the solar cell, and environmental conditions such as temperature and sunlight intensity.

Offshore PV systems may be arranged to withstand harsh marine conditions, including high humidity, saltwater corrosion, and strong winds. To address these challenges, the panels may be encapsulated in corrosion-resistant materials and mounted on floating platforms or integrated into offshore structures such as oil rigs or wind turbines. The generated electricity can be used to power various offshore operations, reducing reliance on fossil fuels and minimizing environmental impact. Additionally, offshore PV systems can be coupled with energy storage solutions, such as batteries, to ensure a stable and continuous power supply even during periods of low sunlight. The integration of PV systems in offshore settings may also contribute to reduction of carbon emissions and promotion of renewable energy sources.

In certain examples, PV systems may be installed at an inclined angle to optimize sunlight capture. The angle range may be about 5 degrees or more to about 55 degrees or less, such as about 10 degrees or more to about 50 degrees or less, such as about 15 degrees or more to about 45 degrees or less, such as about 20 degrees to about 40 degrees. The incline of the angle may depend on factors such as site environment, site placement, latitude, altitude, and the like. However, periodic cleaning to remove bird droppings may be needed to maintain optimal PV system performance, creating a demand for regular human intervention and maintenance. While special coatings can be applied to the surface to reduce the adhesion of bird droppings, this approach may reduce energy production and hinder optimal PV performance over time. In at least one embodiment, the coating may be a superhydrophobic coating. In at least one embodiment, the coating may be a oleophobic coating. To address this issue, embodiments of the present disclosure provide a system which integrates hybrid solar PV and wind turbine technologies to increase PV throughput and reduce the need for human intervention.

In at least one embodiment, the enhanced PV system provided herein offers several significant advantages for improving primary electricity generation. By vertically mounting the PV modules, the system may be configured or otherwise arranged to effectively minimize dust accumulation. This vertical mounting, which is discussed in detail below, may enhance the performance of the PV system and reduce the need for frequent cleaning. Additionally, the integration of wind turbines and bird spikes at the top of the structure may serve a dual purpose. The wind turbines not only generate supplementary renewable energy but also create an environment that is less conducive to bird nesting. The bird spikes further deter birds from perching and nesting on the structure, thereby significantly reducing the risk of bird droppings on the PV modules. These and other embodiments may enhance the efficiency and longevity of the PV system and reduce maintenance requirements, making it effective for sustainable offshore energy production.

FIG. 1 is a schematic representation of an example PV system 100. System 100 includes a set of vertically mounted PV panels 102*a-f* and a set of wind turbines 104*a*-104*c*. The system 100 may be arranged or otherwise configured as a triangular lattice (e.g., similar to a hollow triangular prism without end surfaces). The PV panels 102*a-f* may be configured or otherwise arranged along the rectangular faces of the system 100. In at least one example, the PV panels 102*a*, 102*b*, and 102*c* may be vertically stacked and flush with one another, such that the whole of one face of the system 100 includes the PV panels 102*a*, 102*b*, and 102*c*, and the whole of another face of the system 100 includes the PV panels 102*d*, 102*e*, and 102*f*. The system 100 may be a tower structure, which may be movable to optimize solar exposure at the PV panels 102*a-f*. Additionally, the system 100 includes wind turbines 104*a-c*. The wind turbines 104*a-c* may be coupled to the PV panels 102*a-f* on the top of the system 100. The wind turbines 104*a-c* may be placed on the edges 106*a-c* of the system 100. In at least one embodiment, the wind turbines 104*a-c* may be configured or otherwise arranged about a vertical axis (not shown). In at least on embodiment, the turbines 104*a-c* may supplement the energy generation provided by the PV panels 102*a-f* by converting kinetic energy from incoming wind into mechanical energy, which is then transformed into electrical energy. In at least one embodiment, the system may be electrically coupled to an energy storage device 111, which is configured or otherwise arranged to store electricity generated by the system 100. In at least some embodiments, the electricity generated by the system 100 may range from about 2 kilowatts (KW) or more to about 12 kW or less, such as about 3 kW or more to about 11 kW or less, such as about 5 kW or more to about 10 kW or less, though other values are contemplated.

Figure 2:
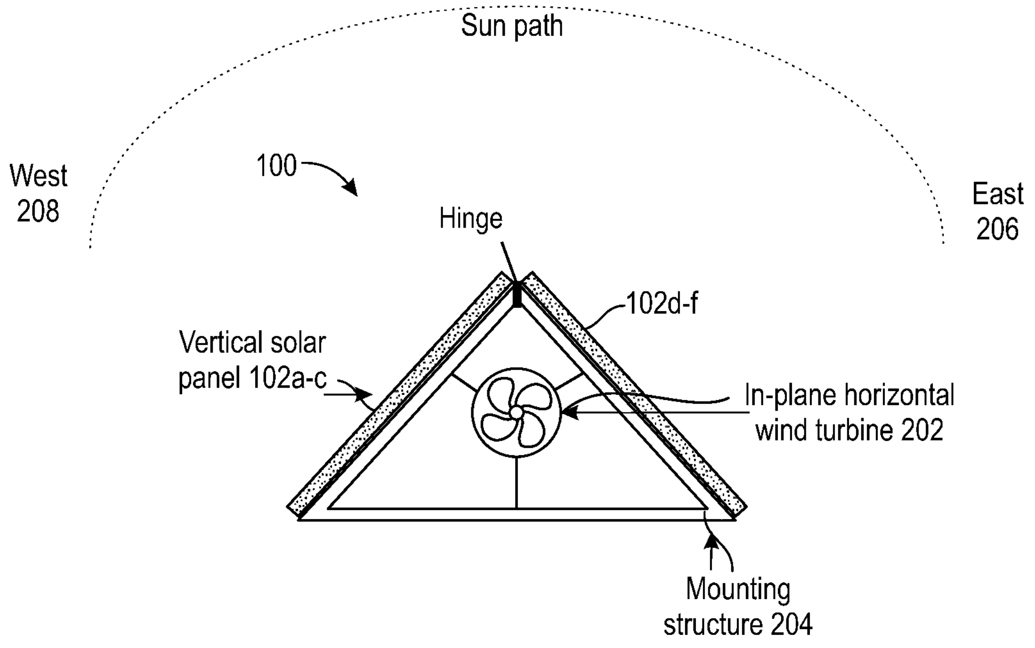
FIG. 2 is a top-view representation of an example PV system, according to one or more embodiments of the present disclosure.

FIG. 2 is a top-view representation of an example PV system 100, which may be further understood with reference to FIG. 1. The system 100 of FIG. 2 may include the components of FIG. 1, an in-plane horizontal wind turbine 202, a mounting structure 204, and a vertical pipe (not shown). In at least one embodiment, the horizontal wind turbine 202 can be mounted in-plane (i.e., where the bottom of the wind turbine is aligned with a plane created by the top of the mounting structure 204 and/or PV panels 102*a-f*) at the upper part of the system 100 by affixing the mounting structure 204 to the top of the vertical pipe (e.g., a stack). The stack vertical pipe may be at the axial center of the mounting structure 204 and may be disposed vertically from the top of the mounting structure 204 to the bottom of the mounting structure 204, such that the vertical pipe stack is flush with the mounting structure. This arrangement may utilize a wind tunnel effect created in the center portion of the system, facilitating an increased harvest of wind energy as movement created by the wind tunnel is directed towards the horizontal wind turbine 202. In at least one embodiment, the solar panels 102*a-c* and 102*d-f* may be placed facing East 206 and/or West 208 to maximize solar absorption throughout the day. In at least one embodiment, solar absorption maximization may be achieve by placing a vertical pipe in a vertical position in the middle of the mounting structure 204.

Figure 3:
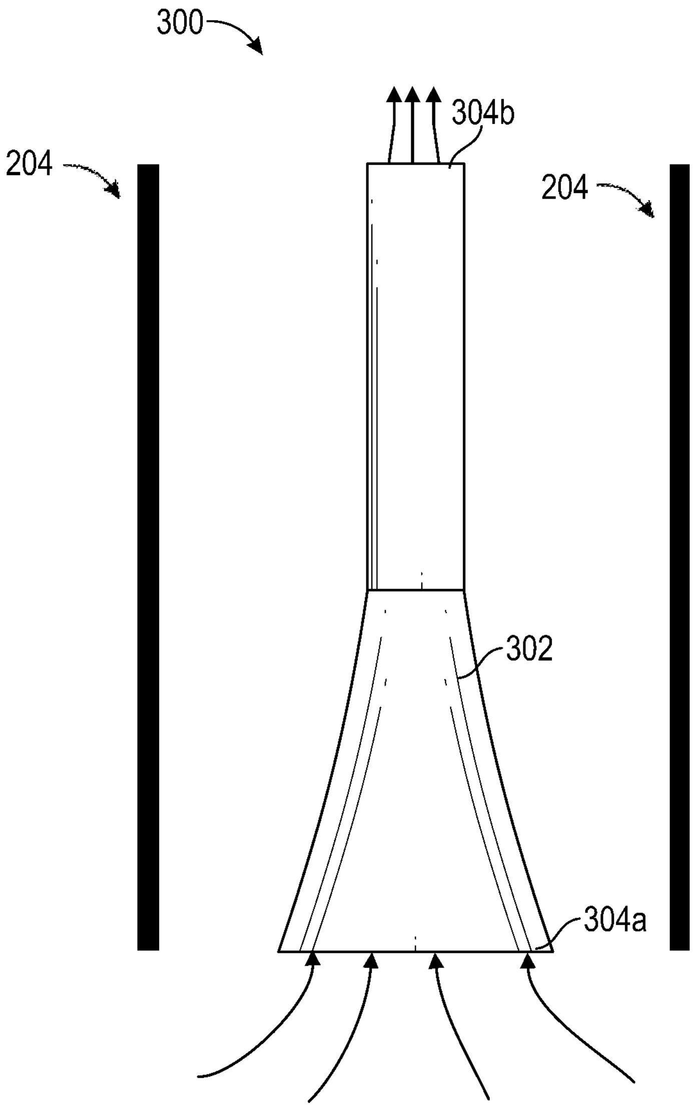
FIG. 3 is a side-view representation of an example PV system, according to one or more embodiments of the present disclosure.

FIG. 3 is a side-view representation of an example PV system 300, which may be further understood with reference to FIGS. 1 and 2. In some embodiments, the system 300 includes any feature of system 100, either alone or in combination. In at least one embodiment, the system 300 may be configured or otherwise arranged in an inverted funnel 302, with a larger opening 304*a* facing downwards and a smaller opening 304*b* facing upwards. In at least one embodiment, the horizontal wind turbine 202 may be coupled to the smaller opening 304*b* or may be disposed in the funnel 302, such as being disposed in the cylindrical portion of the funnel 302. In at least one embodiment, the horizontal wind turbine 202 may be affixed to the vertical pipe of FIG. 2, and the inverted funnel may circumscribe the vertical pipe to direct movement from the wind tunnel towards the horizontal wind turbine 302. This arrangement may enhance the wind flow effect as it moves towards the horizontal wind turbine 202 of FIG. 2, increasing energy production of the system. In at least one embodiment, the inverted funnel 302 may be installed in place of or concurrent with the mounting structure of 204.

In at least on embodiment, systems 100 and/or 300 may be configured or otherwise arranged in a modular manner. In one example, to minimize the load of panels on vertical structures, PV panels 102*a-f* may be considered lightweight PV modules (e.g., modules which may be mounted by adhesion directly to the structure of systems 100 and/or 300 or otherwise installed on predesigned rails that are arranged to facilitate ease of installation). The PV modules may be lightweight polymer-based PV modules, which may minimize the mechanical load on vertical structures by way of the lightweight character of the material. In one example, systems 100 and/or 300 may be considered modular where units are added on top of each other using a suitable mounting system to meet higher energy need depending on the load requirements. Each unit may be configured or otherwise arranged with a height of about 0.5 meters (m) or more to about 1.5 m or less, such as about 1 m. Height may correspond to the module width where module orientation has a landscape orientation (e.g., see the orientation of the PV panels 102*a-f* of FIG. 1). In at least one embodiment, the mounting system may utilize a screwless push-pull design (e.g., the three steel bars or tubes used on the edge of the structure, which may be plugged onto the modules) for easy installation of the platform and to avoid corrosion when fasteners and bolts are used. In at least one embodiment, the push pull design may be one or more mechanical clamps affixed to the PV panels 102*a-f* and facing the structure/frame. In at least one embodiment, the one or more mechanical clamps may be affixed to any portion of the PV panels 102*a-f* that are configured or otherwise arranged to sit flush to and/or connect with the structure/frame. In at least one embodiment, the one or more metal clamps may be a push-pull pin. In at least one embodiment, the one or more metal clamps may be a bolt design with a spring load retractable flange. In at least one embodiment, metal profiles (e.g., preferably steel tubes) may be plugged together in a vertical position and fixed to the systems 100 and/or 300.

In at least one embodiment, the mounting system may allow for additional PV modules to be mounted onto the systems 100 and/or 300. In one example, additional PV modules may include a seventh PV panel to be mounted vertically above PV panel 102*a* and an eighth PV panel to be mounted vertically above PV panel 102*b*. With the addition of a seven and eight panel to the systems 100 and/or 300, the systems 100 and/or 300 may increase their energy production throughput to meet the energy needs of the offshore structure upon which they are installed. Additional modules may be added using the screwless design of the steel pipes discussed above.

Figure 4:
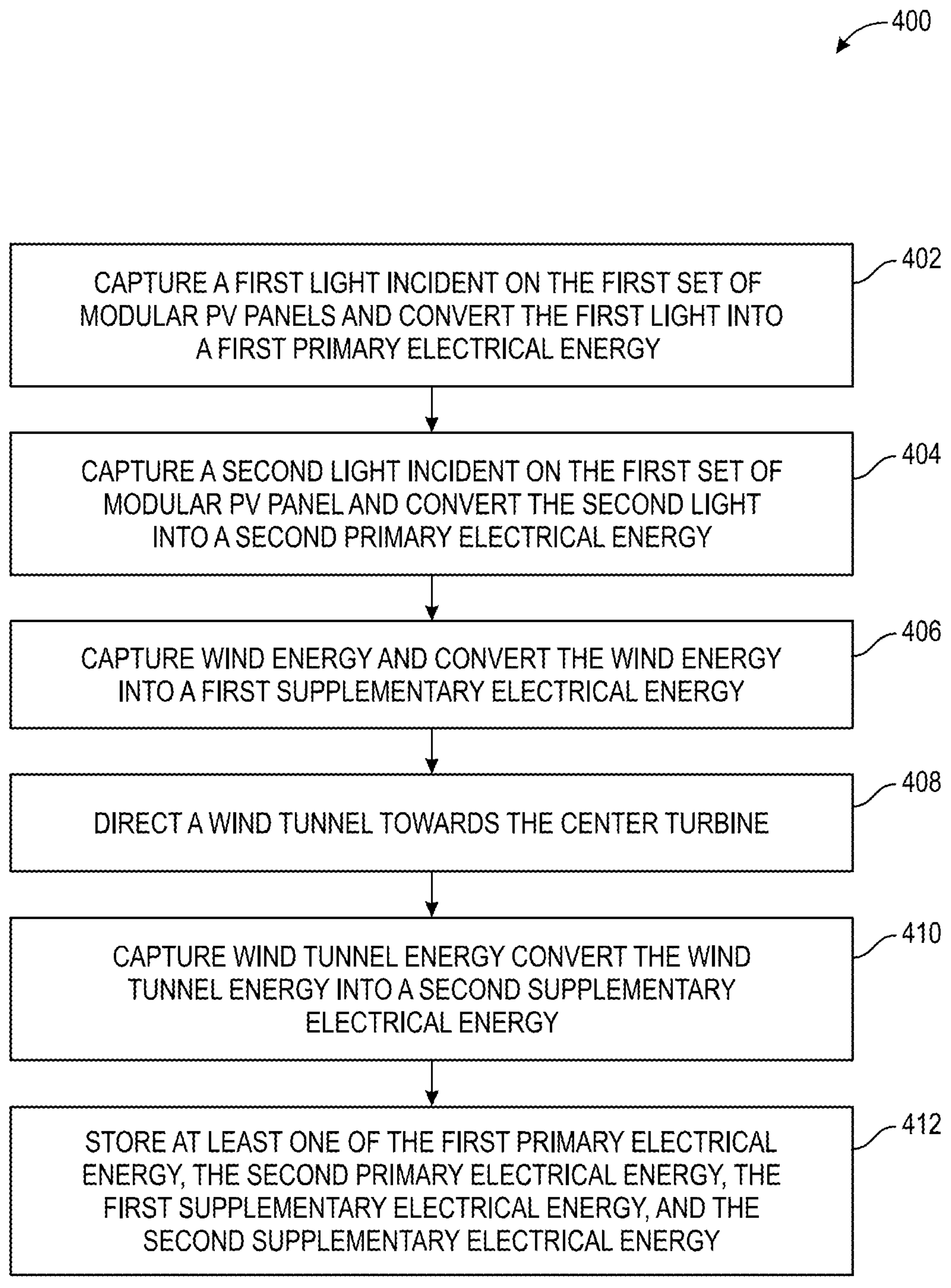
FIG. 4 is a schematic flowchart of an example method for implementing energy production procedures by a system for offshore energy production, according to one or more embodiments of the present disclosure.

FIG. 4 is a schematic flowchart of an example method 400 for implementing energy production procedures by a system for offshore energy production, such as system 100 of FIG. 1 and system 300 of FIG. 3. The system may be a portable system.

A system for offshore production may include a mounting frame including at least two vertical sides. The vertical sides may be attached to one another and may be arranged to form an oblique angle or a perpendicular angle between the vertical sides. The system may include a first set of modular PV panels, which may be affixed to a first side of the at least two vertical sides. The first set of modular PV panels may be configured or otherwise arranged to perform any one of the steps of method 400. The system may include a second set of modular PV panels, which may be affixed to a second side of the at least two vertical sides. The second set of modular PV panels may be configured or otherwise arranged to perform any one of the steps of method 400. The system may include a set of turbines, which may be affixed to each of the top corners of the mounting structure. The second set of turbines may be configured or otherwise arranged to perform any one of the steps of method 400.

The system may further include a vertical pipe, which may be affixed to the mounting frame and disposed through the axial center of the mounting frame. The system may further include a center turbine, which may be affixed to the top of the pipe. The center turbine may be configured or otherwise arranged to perform any one of the steps of method 400. The system may further include an inverted tunnel, which may be affixed within the mounting frame and coaxial with the pipe. The inverted tunnel may be configured or otherwise arranged to perform any one of the steps of method 400. In one example, the inverted tunnel includes a first opening substantially aligned with a bottom of the mounting frame and second opening substantially aligned with a top of the mounting frame, the first opening being larger than the second opening.

The system may further include a mounting frame having a third vertical side affixed to at least the two vertical sides. The system may further include a mounting frame arranged as a triangular lattice. The system may further include at least six PV panels, with three panels disposed on one side of the mounting frame and three panels on another side of the mounting frame. The system may further include PV panels affixed to the mounting frame via a screwless push-pull mechanism. The system may further include PV panels configured or otherwise arranged to adjust the oblique angle or the perpendicular angle to follow the first light and the second light. The system may further include a set of spikes affixed to the mounting frame. The system may further include PV panels made of a lightweight polymer-based material. The system may further include PV panels coated with an anti-dust coating. The system may further include PV panels affixed to the mounting frame in a landscape orientation. The system may further include an energy storage device electrically coupled to at least one of the first set of modular PV panels, the second set of modular PV panels, and the set of turbines. The energy storage device may be may be configured or otherwise arranged to perform any one of the steps of method 400.

Method 400 begins at operation 402 with the system capturing a first light incident on the first set of modular PV panels and convert the first light into a first primary electrical energy.

Method 400 continues to operation 404 with the system capturing a second light incident on the first set of modular PV panels and converting the second light into a second primary electrical energy.

Method 400 continues to operation 406 with the system capturing wind energy and converting the wind energy into a first supplementary electrical energy.

Method 400 continues to operation 408 with the system directing a wind tunnel towards the center turbine.

Method 400 continues to operation 410 with the system capturing wind tunnel energy convert the wind tunnel energy into a second supplementary electrical energy.

Method 400 continues to operation 412 storing at least one of the first primary electrical energy, the second primary electrical energy, the first supplementary electrical energy, and the second supplementary electrical energy.

FIG. 4 is just one example of a method, and other methods including fewer, additional, or alternative operations are contemplated consistent with the disclosure.

The systems and method described herein provide a lightweight, portable system capable of consistently deterring nesting birds through continuous blade movement and a vertical structure. The system minimizes soiling losses and bird droppings on solar panels, reduces the mechanical load on structures, and is suitable for platforms with limited space due to its small installation footprint. The modular system which may be affixed to the primary system may employ a screwless push-pull design for easy installation and maintenance, avoiding corrosion of fasteners and bolts. Additionally, the integration of wind turbines helps generate more energy without occupying additional space, potentially reducing the required PV system capacity.

Implementation Examples are Described in the Following Numbered Aspects:

Aspect 1: A system for offshore energy production, including a mounting frame including at a first vertical side and a second vertical side, wherein the first and second vertical sides are arranged at an angle relative to one another, a first set of modular photovoltaic (PV) panels affixed to the first vertical side, the first set of modular PV panels configured to capture a first light incident on the first set of modular PV panels and convert the first light incident into a first primary electrical energy, a second set of modular PV panels affixed to the second vertical side, the second set of modular PV panels configured to capture a second light incident on the first set of modular PV panels and convert the second light incident into a second primary electrical energy, and a set of turbines affixed to each top corner of the mounting structure, the set of wind turbines configured to capture wind energy and convert the wind energy into a first supplementary electrical energy.

Aspect 2: The system of aspect 1, further including a stack affixed to the mounting frame and disposed between the first vertical side and the second vertical side, and a center turbine coupled to the stack, the center turbine configured to convert the wind into a second supplementary electrical energy.

Aspect 3: The system of aspect 2, further comprising an inverted funnel affixed within the mounting frame, wherein the inverted funnel is configured to direct the wind into the stack towards the center turbine.

Aspect 4: The system of aspect 3, wherein a bottom opening of the inverted funnel is flush with the bottom of the mounting frame and a top opening of the inverted funnel is flush with a top of the mounting frame.

Aspect 5: The system of any one of aspects 1 through 4, wherein the mounting frame includes a third vertical side affixed to the first vertical side and the second vertical side.

Aspect 6: The system of any one of aspects 1 through 5, wherein the mounting frame is a triangular lattice.

Aspect 7: The system of any one of aspects 1 through 6, wherein the first set of PV panels includes at least three PV panels, and the second set of PV panels includes at least three PV panels.

Aspect 8: The system of any one of aspects 1 through 7, wherein the first and second vertical sides are hinged together, wherein the first and second side are moveable relative to one another about the hinge to adjust the angle to follow the first light and the second light.

Aspect 9: The system of any one of aspects 1 through 8, further including a set of spikes affixed to the top of the mounting frame and configured of otherwise arranged to deter wildlife.

Aspect 10: The system of any one of aspects 1 through 9, wherein the first set of PV panels and the second set of PV panels are lightweight polymer-based PV panels.

Aspect 11: The system of any one of aspects 1 through 10, wherein the first set of PV panels and the second set of PV panels are coated with a superhydrophobic coating, a oleophobic coating, or some combination of the superhydrophobic coating and the oleophobic coating.

Aspect 12: The system of any one of aspects 1 through 11, wherein the first set of PV panels and the second set of PV panels are affixed to the mounting frame in a landscape orientation.

Aspect 13: The system of any one of aspects 1 through 12, further including an energy storage device electrically coupled to at least one of the first set of modular PV panels, the second set of modular PV panels, and the set of turbines, the energy storage device configured to store at least one of the first primary electrical energy, the second primary electrical energy, the first supplementary electrical energy, and a second supplementary electrical energy.

Aspect 14: The system of any one of aspects 1 through 13, wherein the system is a portable system.

Aspect 15: The system of any one of aspects 1 through 14, wherein the angle is 20 degrees or more to 50 degrees or less.

Aspect 16: A system for offshore energy production, including a mounting frame including at a first vertical side and a second vertical side, wherein the first and second vertical sides are arranged at an angle relative to one another, a first set of modular photovoltaic (PV) panels affixed to the first vertical side, the first set of modular PV panels configured to capture a first light incident on the first set of modular PV panels and convert the first light incident into a first primary electrical energy, a second set of modular PV panels affixed to the second vertical side, the second set of modular PV panels configured to capture a second light incident on the first set of modular PV panels and convert the second light incident into a second primary electrical energy, and a set of turbines affixed to each top corner of the mounting structure, the set of wind turbines configured to capture wind energy and convert the wind energy into a first supplementary electrical energy, a stack affixed to the mounting frame and disposed between the first vertical side and the second vertical side, a center turbine coupled to the stack, the center turbine configured to convert the wind into a second supplementary electrical energy, and an inverted funnel affixed within the mounting frame, wherein the inverted funnel is configured to direct the wind into the stack towards the center turbine.

Aspect 17: An apparatus or device including a memory comprising executable instructions, and a processor configured to execute the executable instructions and cause the apparatus to perform a method in accordance with any one of aspects 1-16.

Aspect 18: An apparatus or device, including means for performing a method in accordance with any one of aspects 1-16.

Aspect 19: A non-transitory computer-readable medium including executable instructions that, when executed by a processor of an apparatus, cause the apparatus to perform a method in accordance with any one of aspects 1-16.

Aspect 20: A computer program product embodied on a computer-readable storage medium comprising code for performing a method in accordance with any one of aspects 1-16.

The present disclosure may be a system, a method, and/or a computer program product at any possible technical detail level of integration. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

The terminology used herein is for the purpose of describing particular embodiments only and is not intended to be limiting of the disclosure. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The term "based on" means "based at least in part on." The terms "about" and "approximately" can be used to include any numerical value that can vary without changing the basic function of that value. When used with a range, "about" and "approximately" also disclose the range defined by the absolute values of the two endpoints, e.g. "about 2 to about 4" also discloses the range "from 2 to 4." Generally, the terms "about" and "approximately" may refer to plus or minus 5-10% of the indicated number.

While the disclosure has described several exemplary embodiments, it will be understood by those skilled in the art that various changes can be made, and equivalents can be substituted for elements thereof, without departing from the spirit and scope of the disclosure. In addition, many modifications will be appreciated by those skilled in the art to adapt a particular instrument, situation, or material to embodiments of the disclosure without departing from the essential scope thereof. Therefore, it is intended that the disclosure not be limited to the particular embodiments disclosed, or to the best mode contemplated for carrying out this disclosure, but that the disclosure will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A system for offshore energy production, comprising:

a mounting frame including at a first vertical side and a second vertical side, wherein the first and second vertical sides are arranged at an angle relative to one another;

a first set of modular photovoltaic (PV) panels affixed to the first vertical side, the first set of modular PV panels configured to capture a first light incident on the first set of modular PV panels and convert the first light incident into a first primary electrical energy;

a second set of modular PV panels affixed to the second vertical side, the second set of modular PV panels configured to capture a second light incident on the first set of modular PV panels and convert the second light incident into a second primary electrical energy;

a set of turbines affixed to each top corner of the mounting structure, the set of wind turbines configured to capture wind energy and convert the wind energy into a first supplementary electrical energy; and a center turbine mounted at an axial center of the mounting frame with a bottom of the center turbine aligned with a top of the mounting frame, the center turbine configured to convert wind into a second supplemental electrical energy.

2. The system of claim 1, further comprising:

a vertical pipe at an axial center of the mounting frame and disposed vertically between the top and a bottom of the mounting frame, wherein the center turbine is coupled to the vertical pipe.

3. The system of claim 2, further comprising an inverted funnel affixed within the mounting frame, wherein the inverted funnel is configured to direct the wind into the vertical pipe towards the center turbine arranged in the inverted funnel.

4. The system of claim 3, wherein a bottom opening of the inverted funnel is flush with the bottom of the mounting frame and a top opening of the inverted funnel is flush with a top of the mounting frame.

5. The system of claim 1, wherein the mounting frame includes a third vertical side affixed to the first vertical side and the second vertical side.

6. The system of claim 1, wherein the mounting frame is a triangular lattice.

7. The system of claim 1, wherein:

the first set of PV panels includes at least three PV panels; and the second set of PV panels includes at least three PV panels.

8. The system of claim 1, wherein the first and second vertical sides are hinged together by a hinge, wherein the first and second sides are moveable relative to one another about the hinge to adjust the angle to follow the first light and the second light.

9. The system of claim 1, wherein the first set of PV panels and the second set of PV panels are lightweight polymer-based PV panels.

10. The system of claim 1, wherein the first set of PV panels and the second set of PV panels are affixed to the mounting frame in a landscape orientation.

11. The system of claim 1, further including an energy storage device electrically coupled to at least one of the first set of modular PV panels, the second set of modular PV panels, and the set of turbines, the energy storage device configured to store at least one of the first primary electrical energy, the second primary electrical energy, the first supplementary electrical energy, and a second supplementary electrical energy.

12. The system of claim 1, wherein the system is a portable system.

13. The system of claim 1, wherein the angle is 20 degrees or more to 50 degrees or less.

14. The system of claim 1, wherein the first set of PV panels and the second set of PV panels are coated with a superhydrophobic coating.

15. The system of claim 1, wherein the first set of PV panels and the second set of PV panels are coated with an oleophobic coating.

16. A system for offshore energy production, comprising:

a mounting frame including at a first vertical side and a second vertical side, wherein the first and second vertical sides are arranged at an angle relative to one another;

a first set of modular photovoltaic (PV) panels affixed to the first vertical side, the first set of modular PV panels configured to capture a first light incident on the first set of modular PV panels and convert the first light incident into a first primary electrical energy;

a second set of modular PV panels affixed to the second vertical side, the second set of modular PV panels configured to capture a second light incident on the first set of modular PV panels and convert the second light incident into a second primary electrical energy;

a set of turbines affixed to each top corner of the mounting structure, the set of wind turbines configured to capture wind energy and convert the wind energy into a first supplementary electrical energy;

a vertical pipe at an axial center of the mounting frame and between a top and a bottom of the mounting frame;

a center turbine mounted at the axial center of the mounting frame and coupled to the vertical pipe stack, the center turbine configured to convert the wind into a second supplementary electrical energy; and an inverted funnel affixed within the mounting frame, wherein the inverted funnel is configured to direct the wind into the vertical pipe towards the center turbine.

17. The system of claim 16, wherein:

the first set of modular PV panels includes at least three PV panels; and the second set of modular PV panels includes at least three PV panels.

18. The system of claim 16, wherein the mounting frame includes a third vertical side affixed to the first vertical side and the second vertical side.

19. The system of claim 16, wherein a bottom of the center turbine is aligned with a top of the mounting frame when coupled to the vertical pipe.

20. The system of claim 16, wherein the mounting frame is a hollow triangular prism.

* * * * *